(12) United States Patent
Yamada

(10) Patent No.: US 10,348,234 B2
(45) Date of Patent: Jul. 9, 2019

(54) DRIVE SYSTEM, AUTOMOBILE, AND METHOD OF CONTROLLING DRIVE SYSTEM

(71) Applicant: TOYOTA JIDOSHA KABUSHIKI KAISHA, Toyota-shi, Aichi-ken (JP)

(72) Inventor: Kenji Yamada, Komaki (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/960,649

(22) Filed: Apr. 24, 2018

(65) Prior Publication Data

US 2018/0316298 A1    Nov. 1, 2018

(30) Foreign Application Priority Data

Apr. 28, 2017   (JP) ................... 2017-089411

(51) Int. Cl.
| | | |
|---|---|---|
| H02P 6/14 | (2016.01) | |
| H02P 21/00 | (2016.01) | |
| H02P 27/08 | (2006.01) | |
| H02M 7/5387 | (2007.01) | |
| H02M 7/5395 | (2006.01) | |

(52) U.S. Cl.
CPC .......... *H02P 27/08* (2013.01); *H02M 7/5395* (2013.01); *H02P 6/14* (2013.01); *H02P 27/085* (2013.01); *H02M 2007/53876* (2013.01); *H02P 21/00* (2013.01)

(58) Field of Classification Search
CPC ....................................................... H02P 27/08
USPC .................................................. 318/437, 34
See application file for complete search history.

(56) References Cited

U.S. PATENT DOCUMENTS

| | | | |
|---|---|---|---|
| 8,269,439 B2 | 9/2012 | Itoh | |
| 8,829,832 B2 * | 9/2014 | Shouji | H02M 7/53875 318/400.02 |

FOREIGN PATENT DOCUMENTS

| | | |
|---|---|---|
| EP | 2 437 392 A1 | 4/2012 |
| JP | 9-47026 A | 2/1997 |
| JP | 2006-174645 A | 6/2006 |
| JP | 2016-005370 A | 1/2016 |
| RU | 2482595 C1 | 5/2013 |

\* cited by examiner

*Primary Examiner* — David Luo
(74) *Attorney, Agent, or Firm* — Sughrue Mion, PLLC

(57) ABSTRACT

An electronic control unit is configured to perform pulse width modulation control. The pulse width modulation control is to generate signals of a plurality of switching devices of an inverter by comparing a modulation wave of a voltage command of each phase based on a torque command of the motor, with a carrier wave, and perform switching of the switching devices. The electronic control unit is configured to generate the carrier wave so that, in each unit interval, a required time in the unit interval is equal to a total time of a plurality of unit components, and, in at least one unit interval, durations of at least two unit components of a plurality of unit components are different from each other.

12 Claims, 6 Drawing Sheets

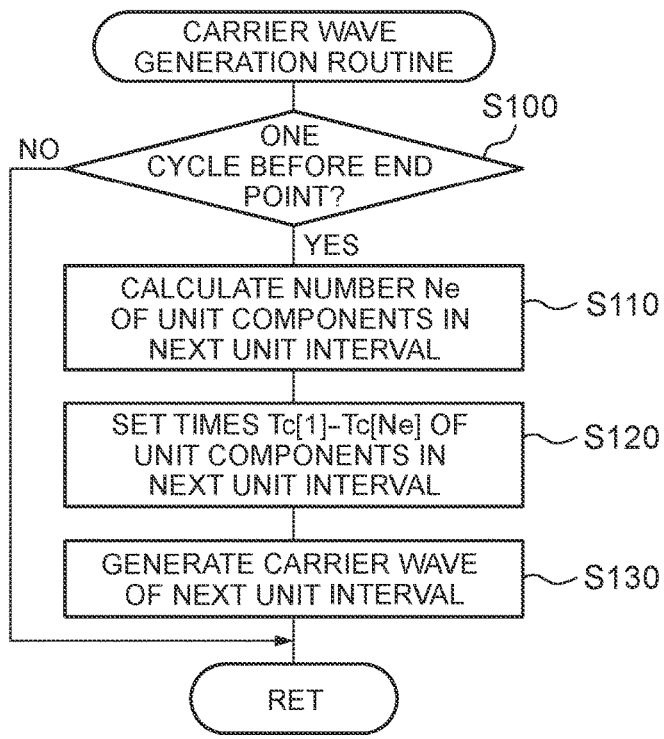
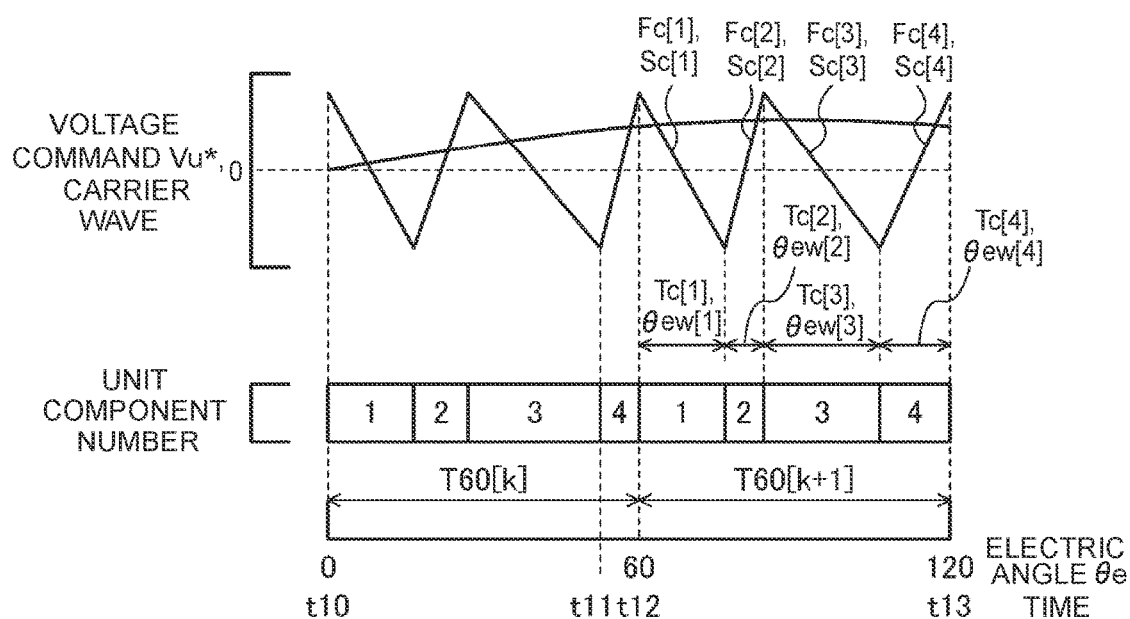

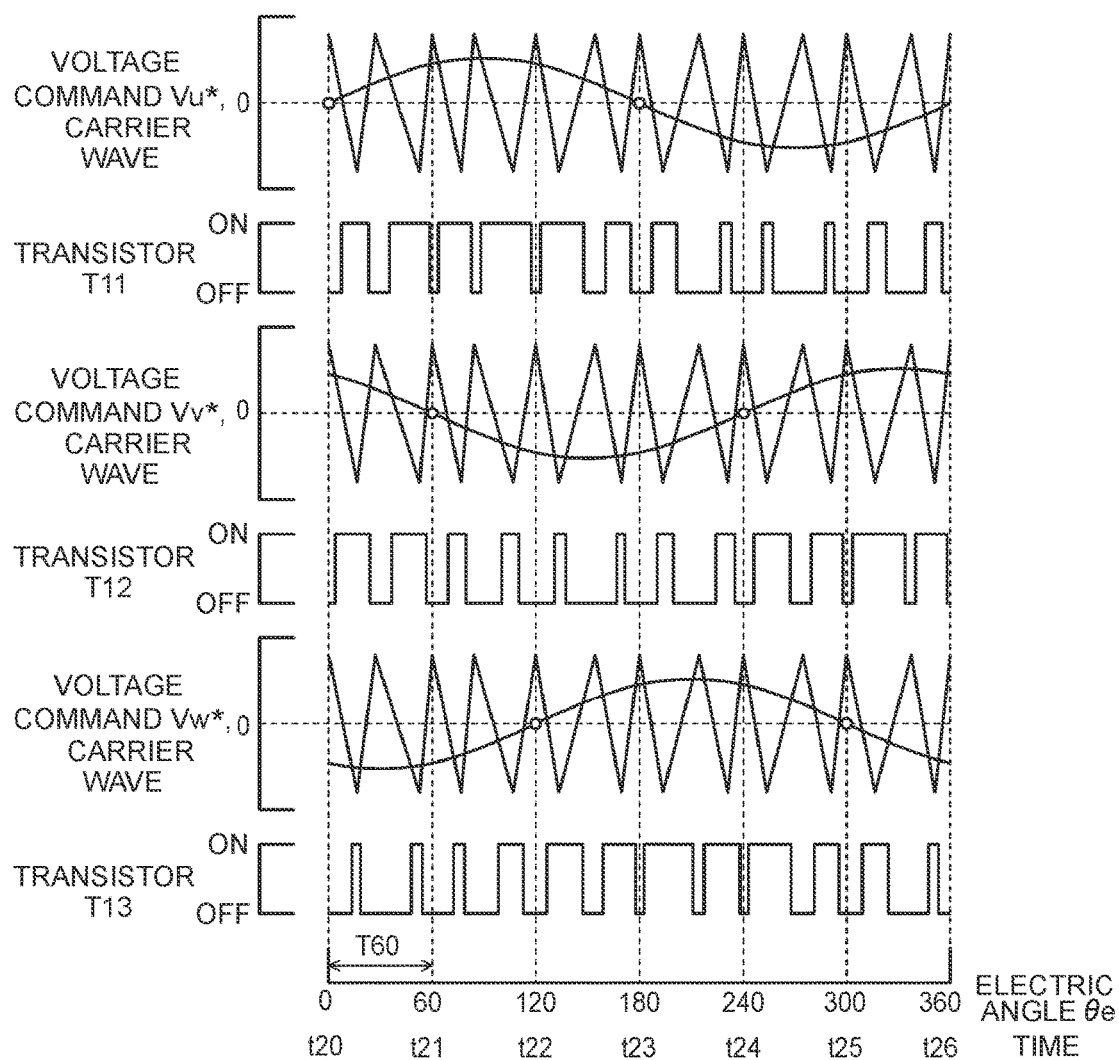

DRIVE SYSTEM, AUTOMOBILE, AND METHOD OF CONTROLLING DRIVE SYSTEM

INCORPORATION BY REFERENCE

The disclosure of Japanese Patent Application No. 2017-089411 filed on Apr. 28, 2018 including the specification, drawings and abstract is incorporated herein by reference in its entirety.

BACKGROUND

1. Technical Field

The disclosure relates to a drive system, an automobile, and a method of controlling the drive system, and more particularly to a drive system including a motor and an inverter, a method of controlling the drive system, and an automobile on which the drive system is installed.

2. Description of Related Art

As one example of this type of drive system, a drive system including a three-phase motor, and an inverter that converts DC voltage from a DC power source, into AC voltage, by switching ON/OFF of switching devices, and outputs the AC voltage to the motor, has been proposed (see Japanese Patent Application Publication No. 2016-5370 (JP 2016-5370 A), for example). The drive system is configured to generate a PWM (pulse width modulation) signal by comparing a modulation wave (fundamental wave) with a carrier wave, and output the signal to the inverter. The drive system determines a continuation period as a product of a ⅙ period of the modulation wave and a random number, calculates a plurality of carrier-wave frequencies by multiplying the frequency of the modulation wave by different coefficients that are multiples of 3 and odd numbers, and switches the carrier-wave frequencies according to the continuation period. In this manner, harmonics in given frequency bands are prevented from sticking out or becoming too large in amplitude, and electromagnetic noise is reduced.

SUMMARY

In the drive system as described above, where a segment of the carrier wave between two extreme values (between a maximum value and a minimum value and between a minimum value and a maximum value) is defined as a unit component, the number of the unit components in each unit interval (a ⅙ period of the modulation wave) is switched according to the continuation period (one unit interval, or two unit intervals, or three unit intervals, for example). Therefore, the number of unit components in each unit interval may not be set to a desired value. Namely, at least in the unit interval immediately after switching, the number of unit components in the unit interval immediately before switching cannot be selected.

A drive system, automobile, and a method of controlling the drive system according to this disclosure reduce electromagnetic noise while making the number of unit components in each unit interval equal to a desired value.

A first aspect of the disclosure is concerned with a drive system. The drive system includes a multi-phase motor, an inverter including a plurality of switching devices and configured to drive the motor through switching of the switching devices, and an electronic control unit configured to perform pulse width modulation control. The pulse width modulation control is a control that generates pulse width modulation signals of the plurality of switching devices by comparing a modulation wave of a voltage command of each phase based on a torque command of the motor, with a carrier wave, and performs switching of the plurality of switching devices. The electronic control unit is configured to generate the carrier wave so as to satisfy conditions (i) and (ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals. The above conditions are (i) in each of the unit intervals, a required time in the unit interval is equal to a total time of a plurality of unit components, and (ii) in at least one of the unit intervals, durations of at least two unit components of the plurality of unit components are different from each other.

Where a segment of the carrier wave between two extreme values is defined as "unit component", and an interval of a given electric angular width obtained by dividing one period (360 degrees in electric angle) of the modulation wave of the voltage command by twice the number of phases of the motor is defined as "unit interval", the electronic control unit generates the carrier wave, such that the required time in the unit interval is equal to the total time of the plurality of unit components, in each unit interval, and the durations of at least two unit components, out of the plurality of unit components, are different from each other, in at least one unit interval. With this configuration, it is possible to reduce electromagnetic noise by preventing harmonics in given frequency bands from sticking out, while making the number of unit components in each unit interval equal to a desired value.

In the drive system as described above, the electronic control unit may be configured to generate the carrier wave such that the duration of the unit component changes irregularly. With this configuration, electromagnetic noise can be further reduced.

In the drive system as described above, the electronic control unit may be configured to generate the carrier wave such that the number of the unit components is constant in two consecutive unit intervals of unit intervals. With this configuration, the number of unit components in each unit interval can be made constant and equal to a desired value when the rotational speed of the motor and the synchronous number are constant. Here, the "synchronous number" is the number of periods of the carrier wave in one period (360 degrees in electric angle) of the modulation wave of the voltage command of each phase.

In the drive system as described above, the electronic control unit may be configured to generate the carrier wave, such that, in two consecutive unit intervals as at least a part of the plurality of unit intervals, durations of the unit components immediately before and after a boundary of the two consecutive unit intervals may be equal to each other. The electronic control unit may be configured to generate the carrier wave, such that, in at least a part of the unit intervals in each of which the number of the unit components is equal to a first predetermined number, the durations of a second predetermined number of consecutive ones of the unit components in the same unit interval are equal to each other, where the first predetermined number is 3 or greater, and the second predetermined number is equal to or greater than 2 and less than the first predetermined number. With this configuration, harmonics can be more appropriately dispersed.

In the drive system as described above, the electronic control unit may be configured to generate the carrier wave, such that each zero-crossing point in time at which the modulation wave of the voltage command of any of the phases crosses an axis of zero coincides with an end point in time of each of the unit intervals. With this configuration, the controllability of the motor can be further enhanced.

In the drive system as described above, the number of the phases of the motor may be 3, and the required time in the unit interval may be a period of time required for the motor to rotate 60 degrees in electric angle.

A second aspect of the disclosure is concerned with a drive system. The drive system includes a multi-phase motor, an inverter including a plurality of switching devices and configured to drive the motor through switching of the switching devices, and an electronic control unit configured to perform pulse width modulation control. The pulse width modulation control is a control that generates pulse width modulation signals of the plurality of switching devices by comparing a modulation wave of a voltage command of each phase based on a torque command of the motor, with a carrier wave, and performs switching of the plurality of switching devices. The electronic control unit is configured to generate the carrier wave so as to satisfy conditions (i) and (ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals. The above conditions are (i) in each of the unit intervals, a required time in the unit interval is equal to a total time of a plurality of unit components, and (ii) in at least one of the unit intervals, frequencies of at least two unit components of the plurality of unit components are different from each other.

Where a segment of the carrier wave between two extreme values is defined as "unit component", and an interval of a given electric angular width obtained by dividing one period (360 degrees in electric angle) of the modulation wave of the voltage command by twice the number of phases of the motor is defined as "unit interval", the electronic control unit generates the carrier wave, such that the required time in the unit interval is equal to the total time of the plurality of unit components, in each unit interval, and the frequencies of at least two unit components, out of the plurality of unit components, are different from each other, in at least one unit interval. With this configuration, it is possible to reduce electromagnetic noise by preventing harmonics in given frequency bands from sticking out, while making the number of unit components in each unit interval equal to a desired value.

A third aspect of the disclosure is concerned with a drive system. The drive system includes a multi-phase motor, an inverter including a plurality of switching devices and configured to drive the motor through switching of the switching devices, and an electronic control unit configured to perform pulse width modulation control. The pulse width modulation control is to generate pulse width modulation signals of the plurality of switching devices by comparing a modulation wave of a voltage command of each phase based on a torque command of the motor, with a carrier wave, and perform switching of the plurality of switching devices. The electronic control unit is configured to generate the carrier wave so as to satisfy conditions (i) and (ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of the unit intervals. The above conditions are (i) in each of the unit intervals, a required time in the unit interval is equal to a total time of a plurality of unit components, and (ii) in at least one of the unit intervals, absolute values of slopes of at least two unit components of the plurality of unit components are different from each other.

Where a segment of the carrier wave between two extreme values is defined as "unit component", and an interval of a given electric angular width obtained by dividing one period (360 degrees in electric angle) of the modulation wave of the voltage command by twice the number of phases of the motor is defined as "unit interval", the electronic control unit generates the carrier wave, such that the required time in the unit interval is equal to the total time of the plurality of unit components, in each unit interval, and the absolute values of the slopes of at least two unit components, out of the plurality of unit components, are different from each other, in at least one unit interval. With this configuration, it is possible to reduce electromagnetic noise by preventing harmonics in given frequency bands from sticking out, while making the number of unit components in each unit interval equal to a desired value.

A fourth aspect of the disclosure is concerned with a drive system. The drive system includes a multi-phase motor, an inverter including a plurality of switching devices and configured to drive the motor through switching of the switching devices, and an electronic control unit configured to perform pulse width modulation control. The pulse width modulation control is a control that generates pulse width modulation signals of the plurality of switching devices by comparing a modulation wave of a voltage command of each phase based on a torque command of the motor, with a carrier wave, and performs switching of the plurality of switching devices. The electronic control unit is configured to generate the carrier wave so as to satisfy conditions (i) and (ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals. The above conditions are (i) in each of the unit intervals, a required time in the unit interval is equal to a total time of a plurality of unit components, and (ii) in at least one of the unit intervals, electric angular widths of at least two unit components of the plurality of unit components are different from each other.

Where a segment of the carrier wave between two extreme values is defined as "unit component", and an interval of a given electric angular width obtained by dividing one period (360 degrees in electric angle) of the modulation wave of the voltage command by twice the number of phases of the motor is defined as "unit interval", the electronic control unit generates the carrier wave, such that the required time in the unit interval is equal to the total time of the plurality of unit components, in each unit interval, and the electric angular widths of at least two unit components, out of the plurality of unit components, are different from each other, in at least one unit interval. With this configuration, it is possible to reduce electromagnetic noise by preventing harmonics in given frequency bands from sticking out, while making the number of unit components in each unit interval equal to a desired value.

A fifth embodiment of the disclosure is concerned with an automobile on which the above-described drive system is installed, and which is configured to travel using power from the motor. With this configuration, the drive system of any aspect of the disclosure as described above is installed on the automobile; therefore, the automobile yields effects similar to the effects provided by the drive system as described above, for example, the effect to reduce electromagnetic noise while making the number of unit components in each unit interval equal to a desired value. As a result, the driver or passenger(s), and pedestrians, etc. around the automobile, are less likely or unlikely to feel electromagnetic noise.

A fifth embodiment of the disclosure is concerned with an automobile. The automobile includes a multi-phase motor, an inverter including a plurality of switching devices and configured to drive the motor through switching of the switching devices, and an electronic control unit configured to perform pulse width modulation control. The pulse width modulation control is a control that generates pulse width modulation signals of the plurality of switching devices by comparing a modulation wave of a voltage command of each phase based on a torque command of the motor, with a carrier wave, and performs switching of the plurality of switching devices. The electronic control unit is configured to generate the carrier wave so as to satisfy conditions (i) and (ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals. The above conditions are (i) in each of the unit intervals, a required time in the unit interval is equal to a total time of a plurality of unit components, and (ii) in at least one of the unit intervals, durations of at least two unit components of the plurality of unit components are different from each other.

A sixth embodiment of the disclosure is concerned with a method of controlling a drive system. The drive system includes a multi-phase motor, an inverter including a plurality of switching devices and configured to drive the motor through switching of the switching devices, and an electronic control unit configured to perform pulse width modulation control. The pulse width modulation control is a control that generates pulse width modulation signals of the plurality of switching devices by comparing a modulation wave of a voltage command of each phase based on a torque command of the motor, with a carrier wave, and performs switching of the plurality of switching devices. The method includes generating, by the electronic control unit, the carrier wave so as to satisfy conditions (i) and (ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals. The above conditions are (i) in each of the unit intervals, a required time in the unit interval is equal to a total time of a plurality of unit components, and (ii) in at least one of the unit intervals, durations of at least two unit components of the plurality of unit components are different from each other.

With the method as described above, it is possible to reduce electromagnetic noise by preventing harmonics in given frequency bands from sticking out, while making the number of unit components in each unit interval equal to a desired value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart illustrating one example of a carrier wave generation routine executed by an electronic control unit 50;

FIG. 3 is an explanatory view showing one example of the manner of generating a carrier wave;

FIG. 4 is an explanatory view showing one example of waveforms of modulation waves Vu*, Vv*, Vw* of voltage commands of respective phases, carrier wave, and PWM signals of transistors T11, T12, T13;

DETAILED DESCRIPTION OF EMBODIMENTS

Figure 1:
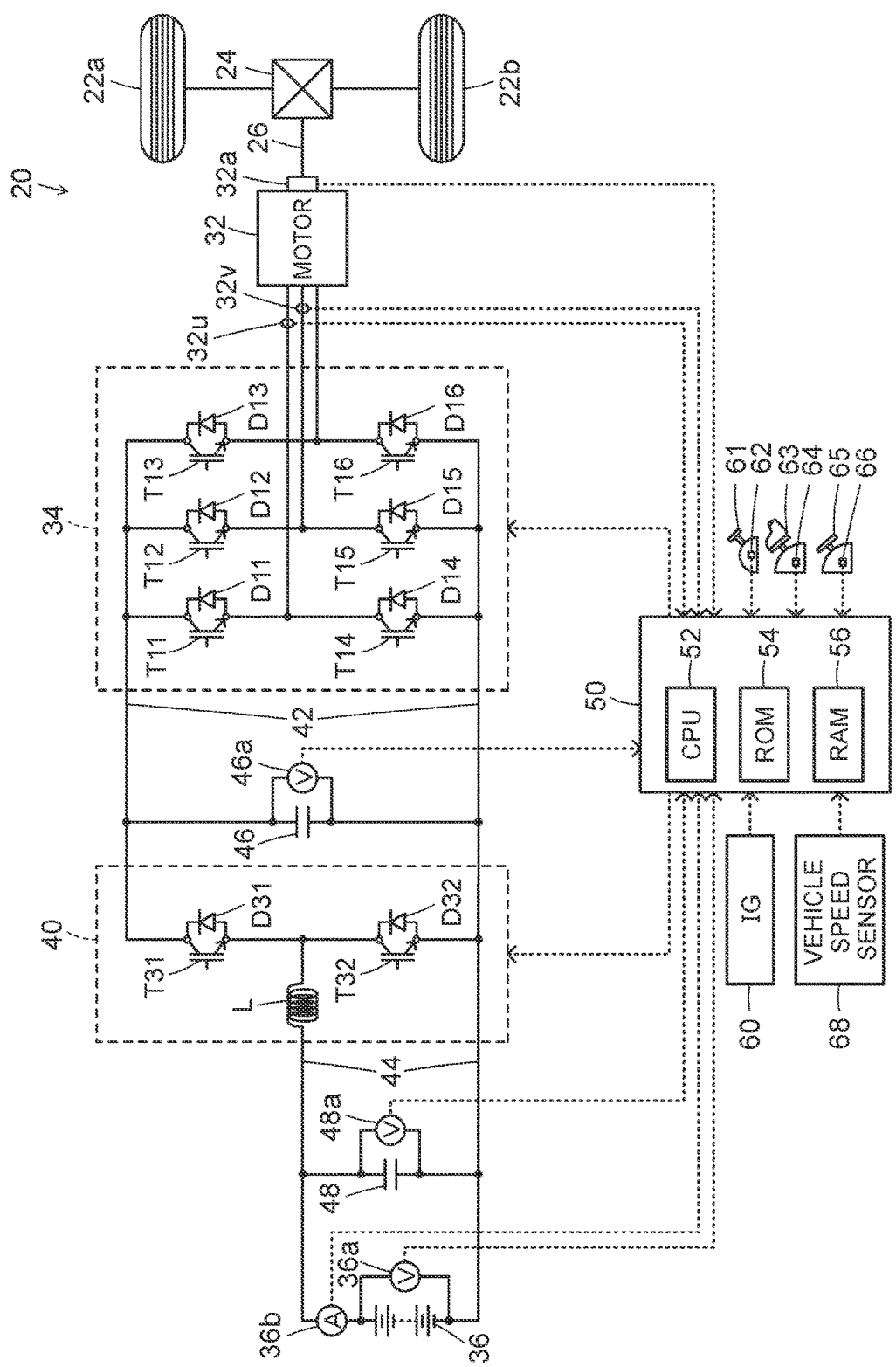
FIG. 1 is a view schematically showing the configuration of an electric vehicle 20 on which a drive system as one embodiment of the disclosure is installed.

One embodiment of the disclosure will be described. FIG. 1 schematically shows the configuration of an electric vehicle 20 on which a drive system as one embodiment of the disclosure is installed. As shown in FIG. 1, the electric vehicle 20 of this embodiment includes a motor 32, inverter 34, battery 36 as a power storage device, boosting converter 40, and an electronic control unit 50.

The motor 32 is in the form of a three-phase synchronous generator-motor, and includes a rotor in which permanent magnets are embedded, and a stator on which three-phase coils are wound. The rotor of the motor 32 is connected to a drive shaft 26 that is connected to drive wheels 22a, 22b via a differential gear unit 24.

The inverter 34 is used for driving the motor 32. The inverter 34 is connected to the boosting converter 40 via a high-voltage-side power line 42, and has six transistors T11-T16, and six diodes D11-D16 connected in parallel with the six transistors T11-T16, respectively. The transistors T11-T16 are arranged in pairs such that the transistors of each pair are disposed on the source side and the sink side, between a positive line and a negative line of the high-voltage-side power line 42, respectively. Also, three-phase coils (phase-U, phase-V, and phase-W coils) of the motor 32 are respectively connected to connection points between the corresponding pairs of transistors T11-T16. Accordingly, when a voltage is applied to the inverter 34, the electronic control unit 50 controls the ratio of the ON times of each pair of the transistors T11-T16, so that the three-phase coils form rotating magnetic fields, and the motor 32 is driven to be rotated. A smoothing capacitor 46 is connected to the positive line and negative line of the high-voltage-side power line 42.

The battery 36 is in the form of a lithium-ion secondary battery or a nickel-metal-hydride secondary battery, for example, and is connected to the boosting converter 40 via a low-voltage-side power line 44. A smoothing capacitor 48 is connected to a positive line and a negative line of the low-voltage-side power line 44.

The boosting converter 40 is connected to the high-voltage-side power line 42 and the low-voltage-side power line 44, and has two transistors T31, T32, two diodes D31, D32 connected in parallel with the two transistors T31, T32, respectively, and a reactor L. The transistor T31 is connected to the positive line of the high-voltage-side power line 42. The transistor T32 is connected to the transistor T31, and the negative lines of the high-voltage-side power line 42 and the low-voltage-side power line 44. The reactor L is connected to a connection point between the transistors T31, T32, and the positive line of the low-voltage-side power line 44. The electronic control unit 50 controls the ratio of the ON times of the transistors T31, T32, so that the boosting converter 40 boosts or raise the voltage of the low-voltage-side power line 44, and supplies the resulting power to the high-voltage-side power line 42, or lowers the voltage of the high-voltage-side power line 42, and supplies the resulting power to the low-voltage-side power line 44.

The electronic control unit 50 is in the form of a microprocessor having CPU 52 as a main component, and includes ROM 54 that stores processing programs, RAM 56 that temporarily stores data, and input and output ports, as well as the CPU 52. The electronic control unit 50 receives signals from various sensors, via the input port. The signals input to the electronic control unit 50 include, for example, a rotational position $\theta m$ from a rotational position detection sensor (such as a resolver) that detects the rotational position of the rotor of the motor 32, and phase currents Iu, Iv from current sensors $32u$, $32v$ that detect phase currents of the respective phases of the motor 32. The input signals also include voltage Vb from a voltage sensor $36a$ mounted between terminals of the battery 36, and current Ib from a current sensor $36b$ placed at an output terminal of the battery 36. The input signals further include voltage VH of the capacitor 46 (the high-voltage-side power line 42) from a voltage sensor $46a$ mounted between terminals of the capacitor 46, and voltage VL of the capacitor 48 (the low-voltage-side power line 44) from a voltage sensor $48a$ mounted between terminals of the capacitor 48. In addition, the input signals include an ignition signal from an ignition switch 60, and a shift position SP from a shift position sensor 62 that detects a position to which a shift lever 61 is operated. Also, the input signals include an accelerator pedal stroke Acc from an accelerator pedal position sensor 64 that detects the amount of depression of an accelerator pedal 63, a brake pedal position BP from a brake pedal position sensor 66 that detects the amount of depression of a brake pedal 65, and the vehicle speed V from a vehicle speed sensor 68. The electronic control unit 50 outputs various control signals via the output port. The signals output from the electronic control unit 50 include, for example, switching control signals to the transistors T1-T6 of the inverter 34, and switching control signals to the transistors T31, T32 of the boosting converter 40. The electronic control unit 50 computes the electric angle $\theta e$, angular velocity $\omega m$, and rotational speed Nm of the motor 32, based on the rotational position $\theta m$ of the rotor of the motor 32 received from the rotational position detection sensor $32a$. The electronic control unit 50 also computes the power storage ratio SOC (state of charge) of the battery 36 based on an integrated value of the current Ib of the battery 36 received from the current sensor $36b$. Here, the power storage ratio SOC is the ratio of the amount of electric power that can be discharged from the battery 36, to the full capacity of the battery 36.

In the electric vehicle 20 of the embodiment constructed as described above, the electronic control unit 50 sets required torque Td* required to be delivered to the drive shaft 26, based on the accelerator pedal stroke Acc and the vehicle speed V, sets the required torque Td* to a torque command Tm* of the motor 32, and performs switching control on the transistors T11-T16 of the inverter 34 so that the motor 32 is driven according to the torque command Tm*. Also, the electronic control unit 50 sets a target voltage VH* of the high-voltage-side power line 42 so that the motor 32 can be driven according to the torque command Tm*, and performs switching control on the transistors T31, T32 of the boosting converter 40 so that the voltage VH of the high-voltage-side power line 42 becomes equal to the target voltage VH*.

Here, control of the inverter 34 will be described. In this embodiment, the inverter 34 is subjected to synchronous pulse width modulation control (synchronous PWM control). The synchronous PWM control, which is selected from the synchronous PWM control and non-synchronous PWM control, is used, because reduction of a harmonic loss and stability of control can be achieved even if the frequency of a carrier wave (carrier frequency) is lowered.

When the synchronous PWM control is performed on the inverter 34, the electronic control unit 50 initially performs coordinate conversion (three-phase to two-phase conversion) to convert the phase currents Iu, Iv of phase U and phase V, into d-axis and q-axis currents Id, Iq, using the electric angle $\theta e$ of the motor 32, assuming that the sum of the phase currents Iu, Iv, Iw of the respective phases (phase U, phase V, phase W) of the motor 32 is equal to zero. Subsequently, d-axis and q-axis current commands Id*, Iq* are set based on the torque command Tm* of the motor 32, and d-axis and q-axis voltage commands Vd*, Vq* are set using the d-axis and q-axis current commands Id*, Iq*, and the currents Id, Iq. Then, the electronic control unit 50 performs coordinate conversion (two-phase to three-phase conversion) to convert the d-axis and q-axis voltage commands Vd*, Vq* into modulation waves Vu*, Vv*, Vw* of voltage commands of the respective phases, using the electric angle $\theta e$ of the motor 32, and produces PMW signals of the transistors T11-T16, by comparing the modulation waves Vu*, Vv*, Vw* of the voltage commands of the respective phases, with the carrier wave (triangular wave). After producing the PMW signals of the transistors T11-T16 in this manner, the electronic control unit 50 performs switching of the transistors T11-T16, using the PWM signals.

In this embodiment, since the motor 32 is the three-phase motor, the synchronous number Ns in the synchronous PWM control is set to a value that is equal to or greater than 6, and a multiple of 3 (6, 9, 12, . . . ). The "synchronous number Ns" is the number of periods of the carrier wave per period (360 degrees in electric angle) of the modulation wave of the voltage command of each phase. The synchronous number N is set based on the rotational speed Nm of the motor 32. In this embodiment, the carrier wave is synchronized (reaches a maximum value or a minimum value) at intervals equal to the interval of zero-crossing electric angles at which any of the modulation waves of the voltage commands of the respective phases crosses the axis (zero value) (i.e., changes from positive to negative or vice versa), namely, at intervals of 60 degrees in electric angle, so as to ensure symmetry of the three-phase voltages supplied to the motor 32. In the following description, the width of 60 degrees in electric angle will be called "unit interval", and the time required for the motor 32 to rotate 60 degrees in electric angle will be called "60-degree required time T60". The 60-degree required time T60 is obtained based on the rotational speed Nm of the motor 32.

Where a unit component of the carrier wave is defined as a component between two consecutive extreme values (between a maximum value and a minimum value and between a minimum value and a maximum value), the number Ne of unit components in each unit interval is obtained according to Eq. (1) below. In Eq. (1), "2" is a coefficient used for converting the synchronous number Ns in the synchronous PWM control into the number of unit components per period (360 degrees in electric angle) of the modulation wave of the voltage command of each phase. In Eq. (1), "60/360" is a coefficient for converting the number of the unit components per period of the modulation wave of the voltage command of each phase, into the number Ne of unit components per unit interval. Here, "60" corresponds to the electric angular width of the unit interval, and "360" corresponds to the electric angular width per period of the modulation wave of the voltage command. In this embodiment, since the synchronous number Ns is equal to a value that is equal to or greater than 6, and is a multiple of 3 (6, 9, 12, . . . ), as described above, the number Ne of unit components is an integer (2, 3, 4, . . . ) equal to or greater than 2.

$$Ne = Ns \times 2 \times 60/360 \quad (1)$$

Next, the operation of the electric vehicle 20 of the embodiment constructed as described above, in particular, the operation performed when a carrier wave (triangular wave) is generated will be described. FIG. 2 is a flowchart illustrating one example of a carrier wave generation routine executed by the electronic control unit 50. This routine is executed at times of appearance of respective extreme values (maximum values and minimum values) of the carrier wave (at a point in time when each of the first to Ne-th unit components in each unit interval ends).

Once the carrier wave generation routine is executed, the electronic control unit 50 determines whether a point in time when this cycle of the routine is executed is one cycle before a point in time when the current unit interval ends, which will be called "the end point of the current unit interval" (step S100). Here, the "end point of the current unit interval" means an end point of the Ne-th unit component in the current unit interval. Accordingly, the "point in time that is one cycle before the end point of the current unit interval" means an end point of the (Ne−1)-th unit component in the current unit interval. If the electronic control unit 50 determines that the point in time when this cycle of the routine is executed is not one cycle before the end point of the current unit interval, this cycle of the routine ends.

If the electronic control unit 50 determines in step S100 that the point in time when this cycle of the routine is executed is one cycle before the end point of the current unit interval, it calculates the number Ne of the unit components in the next unit interval, according to Eq. (1) above (step S110). Then, the electronic control unit 50 sets times (durations) Tc[1] to Tc[Ne] of the first to Ne-th unit components in the next unit interval (step S120), and generates carrier wave for the next unit interval, based on the times Tc[1] to Tc[Ne] of the first to Ne-th unit components set in step S120 (step S130). Then, this cycle of the routine ends.

In step S120, times Tc[1] to Tc[Ne] of the first to Ne-th unit components in the next unit interval are set, such that the 60-degree required time T60 in the next unit interval is equal to the total time (Tc[1]+ . . . +Tc[Ne]) of the first to Ne-th unit components, and times of at least two unit components, out of the times Tc[1] to Tc[Ne] of the first to Ne-th unit components in the next unit interval, differ from each other, while the times Tc[1] to Tc[Ne] of the unit components change irregularly. For example, the times Tc[1] to Tc[Ne] of the first to Ne-th unit components can be set (computed), by multiplying a value (T60/Ne) obtained by dividing the 60-degree required time T60 of the next unit interval by the number Ne of the unit components, by coefficients k[1], . . . , k[Ne] that are irregularly arranged, where the average of these coefficients k[1], . . . , k[Ne] is equal to 1, and at least two of the coefficients are different from each other. In this case, if the "i"-th coefficient k[i] (for example, i=1) in each unit interval is irregularly changed, time Tc[i] of the "i"-th unit component in each unit interval can be changed irregularly, even when the 60-degree required time T60 and the number Ne of the unit components are constant in two or more consecutive unit intervals.

The time Tc and frequency Fc of each unit component satisfy the relationship of "2Tc=1/Fc", and the slope Sc of each unit component is determined as the amount of change in the value of the unit component per unit electric angle (e.g., 1 degree) or unit time (e.g., 1 μsec), according to the time Tc and frequency Fc. Accordingly, making times of at least two unit components, out of the times Tc[1] to Tc[Ne] of the first to Ne-th unit components, different from each other, and irregularly changing the times Tc[1] to Tc[Ne] of the unit components, are equivalent to making frequencies of at least two unit components, out of frequencies Fc[1]-Fc[Ne] of the first to Ne-th unit components, or absolute values of the slopes of at least two unit components, out of absolute values of the slopes Sc[1] to Sc[Ne], different from each other, and irregularly changing the frequencies Fc[1] to Fc[Ne] or absolute values of the slopes Sc[1] to Sc[Ne] of the unit components. Accordingly, instead of setting the times Tc[1] to Tc[Ne] of the first to Ne-th unit components in the next unit interval and generating a carrier wave for the next unit interval, using the set times Tc[1] to Tc[Ne], frequencies Fc[1] to Fc[Ne] or slopes Sc[1] to Sc[Ne] of the first to Ne-th unit components in the next unit interval may be set, and a carrier wave for the next unit interval may be generated using the set frequencies Fc[1] to Fc[Ne] or slopes Sc[1] to Sc[Ne].

The time Tc of each unit component has a correlation to its electric angular width θew. Accordingly, making the 60-degree required time T60 equal to the total time (Tc[1]+ . . . +Tc[Ne]) of the first to Ne-th unit components is equivalent to making the width of 60 degrees in electric angle equal to the total electric angular width (θew[1]+ . . . +θew[Ne]) of the first to Ne-th unit components. Also, making the times of at least two unit components, out of the times Tc[1] to Tc[Ne] of the first to Ne-th unit components, different from each other, and irregularly changing the times Tc[1] to Tc[Ne] of the unit components, are equivalent to making the electric angular widths of at least two unit components, out of electric angular widths θew[1] to θew[Ne] of the first to Ne-th unit components, different from each other, and irregularly changing electric angular widths θew[1] to θew[Ne] of the unit components.

Accordingly, instead of setting the times Tc[1] to Tc[Ne] of the first to Ne-th unit components in the next unit interval and generating a carrier wave for the next unit interval, using the set times Tc[1] to Tc[Ne], the electric angular widths θew[1] to θew[Ne] of the first to Ne-th unit components in the next unit interval may be set, and a carrier wave for the next unit interval may be generated using the set electric angular widths θew[1] to θew[Ne].

The carrier wave may be generated by performing the carrier wave generation routine of FIG. 2 on at least one unit interval, and making the times Tc[1] to Tc[Ne] of the first to Ne-th unit components constant, with respect to the other unit intervals.

FIG. 3 shows one example of the manner of generating a carrier wave. FIG. 3 shows the case where the synchronous number Ns is constant, and is equal to 12 (the number Ne of unit components in each unit interval is equal to 4). In FIG. 3, 0, 60, and 120 degrees in electric angle θe indicate zero-crossing electric angles of respective phases, and end electric angles of the last unit interval, current unit interval, and the next unit interval, and times t10, t12, and t13 indicate respective zero-crossing points in time, and end points in time of the last unit interval, current unit interval, and the next unit interval. Namely, the end electric angle and end point of each unit interval are set to coincide with a corresponding zero-crossing electric angle and a corresponding zero-crossing point, respectively. As a result, the controllability of the motor 32 can be further enhanced. In FIG. 3, "T60[$k$]" (time t10-t12) indicates the 60-degree required time in the current unit interval, and "T60[$k$+1]" (time t12-t13) indicates the 60-degree required time in the next unit interval. In FIG. 3, at time 11 when the end point of the third unit component in the current unit interval is reached, the electronic control unit 50 sets times Tc[1] to Tc[4] of the first to fourth unit components in the next unit interval, such that the 60-degree required time T60[$k$+1] in the next unit interval becomes equal to the total time (Tc[1]+ . . . +Tc[4]) of the first to fourth unit components, and the times of at least two unit components, out of the times Tc[1] to Tc[4] of the first to fourth unit components in the next unit interval, differ from each other, while the times Tc[1] to Tc[Ne] of the unit components change irregularly. Then, a carrier wave for the next unit interval is generated, using the set times Tc[1] to Tc[4]. In this connection, the times Tc[1] to Tc[4] correspond to frequencies Fc[1]-Fc[Ne], absolute values of slopes Sc[1]-Sc[Ne], and electric angles θew[1]-θew[Ne].

Figure 5:
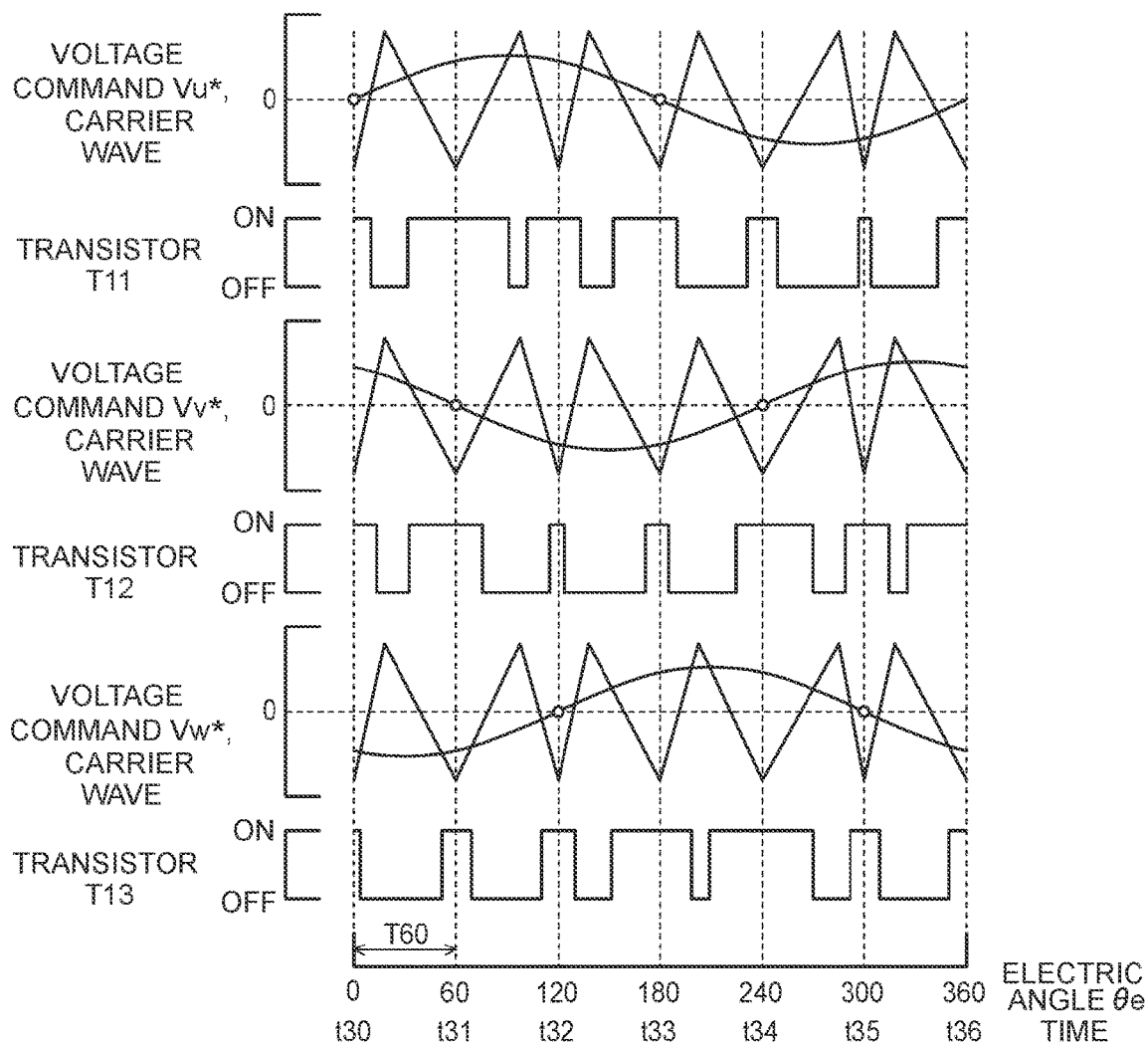
FIG. 5 is an explanatory view showing one example of waveforms of modulation waves Vu*, Vv*, Vw* of voltage commands of respective phases, carrier wave, and PWM signals of transistors T11, T12, T13.

FIG. 4 and FIG. 5 show examples of waveforms of the modulation waves Vu*, Vv*, Vw* of the voltage commands of respective phases, carrier waves, and PWM signals of the transistors T11, T12, T13. FIG. 4 shows the case where the synchronous number Ns is constant, and is equal to 12 (the number Ne of unit components in each unit interval is equal to 4), and FIG. 5 shows the case where the synchronous number Ns is constant, and is equal to 6 (the number Ne of unit components in each unit interval is equal to 2). In FIG. 4, 0 degree, 60 degrees, . . . in electric angle θe indicate respective zero-crossing electric angles, and end electric angles in the respective unit intervals, and times t20, t21, . . . indicate respective zero-crossing points in time, and end points of the respective unit intervals. In FIG. 5, 0 degree, 60 degrees, . . . in electric angle θe indicate respective zero-crossing electric angles, and end electric angles in the respective unit intervals, and times t30, t31, . . . indicate respective zero-crossing points in time, and end points of the respective unit intervals. Namely, in FIG. 4 and FIG. 5, the end electric angle and end point of each unit interval are set to coincide with a corresponding zero-crossing electric angle and a corresponding zero-crossing point in time. As a result, the controllability of the motor 32 can be further improved.

In FIG. 4, the carrier wave is generated such that the times Tc[1]-Tc[4] (or frequencies Fc[1]-Fc[4], or absolute values of slopes Sc[1]-Sc[4], or electric angles θew[1]-θew[4]) of the first to fourth unit components in each unit interval differ from each other, and change irregularly. In FIG. 5, the carrier wave is generated such that the times Tc[1], Tc[2] (or frequencies Fc[1], Fc[2], or absolute values of slopes Sc[1], Sc[2], or electric angles θew[1], θew[2]) of the first and second unit components in each unit interval differ from each other, and change irregularly. With the carrier waves thus generated, even when the amplitude and period of the modulation wave Vu*, Vv*, Vw* of the voltage command of each phase are constant, the PWM signals of the transistors T11-T16 can be changed irregularly. As a result, it is possible to irregularly change (disperse) frequencies contained at a high rate in harmonics, and prevent harmonics in given frequency bands from sticking out, thereby to reduce electromagnetic noise. Further, the number Ne of unit components in each unit interval can be set to a desired value (⅓ of the synchronous motor Ns). For example, if the rotational speed Nm of the motor 32 (or the synchronous number N based on the rotational speed Nm of the motor 32) is constant, the number Ne of unit components can be made constant. Namely, it is possible to reduce electromagnetic noise while setting the number of unit components to a desired value. With the electromagnetic noise thus reduced, the driver and passengers, and pedestrians, etc. around the vehicle, are less likely or unlikely to feel the electromagnetic noise.

In the drive system installed on the electric vehicle 20 of the embodiment as described above, the carrier wave is generated such that the 60-degree required time T60 becomes equal to the total time (Tc[1]+ . . . +Tc[Ne]) of the first to Ne-th unit components, in each unit interval, and the times of at least two unit components, out of the times Tc[1] to Tc[Ne] of the first to Ne-th unit components, differ from each other, while the times Tc[1] to Tc[Ne] of the unit components change irregularly, in at least one unit interval. As a result, it is possible to reduce electromagnetic noise, while setting the number Ne of unit components in each unit interval to a desired value (⅓ of the synchronous number Ns). With these effects provided by the drive system, the driver and passengers of the electric vehicle 20, and pedestrians, etc. around the vehicle, are less likely or unlikely to feel the electromagnetic noise. In this connection, making the times Tc of at least two unit components different from each other, and irregularly changing the times Tc, are equivalent to making at least two frequencies Fc, or absolute values of slopes Sc, or electric angular widths θew, different from each other, and irregularly changing the frequencies Fc, absolute values of slopes Sc, or the electric angular widths θew.

In the drive system installed on the electric vehicle 20 of the embodiment, the carrier wave is generated such that the times Tc (or frequencies Fc, or absolute values of slopes Sc, or electric angular widths θew) of the respective unit components change irregularly, in at least one unit interval. However, the carrier wave may be generated such that the times Tc (or frequencies Fc, or absolute values of slopes Sc, or electric angular widths θew) of the respective unit components changes regularly. In this case, too, it is possible to prevent harmonics in given frequency bands from sticking out, and reduce electromagnetic noise, as compared with the system that makes the time Tc (or frequency Fc, or absolute value of slope Sc, or electric angular width θew) of each unit component uniform or equal, in each unit interval.

Figure 6:
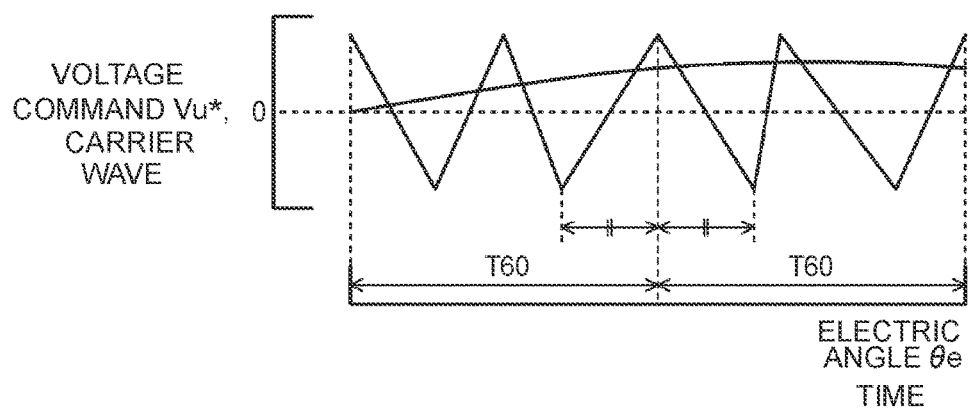
FIG. 6 is an explanatory view showing one example of a carrier wave of a modified example.
Figure 7:
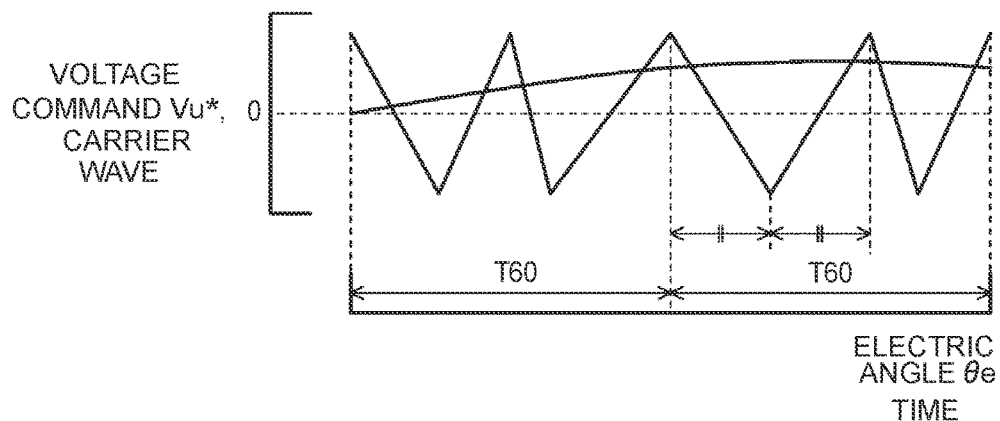
FIG. 7 is an explanatory view showing one example of a carrier wave of a modified example.

In the drive system installed on the electric vehicle 20 of this embodiment, the carrier wave is generated such that the times Tc (or frequencies Fc, or absolute values of slopes Sc, or electric angular widths θew) of at least two unit components differ from each other, in at least one unit interval. However, the carrier wave may be generated such that, in two consecutive unit intervals as a part of the unit intervals, the times Tc (or frequencies Fc, or absolute values of slopes Sc, or electric angular widths θew) of unit components immediately before and after a boundary of the two unit intervals are made equal to each other. FIG. 6 illustrates one example of carrier wave in this case. Also, where the number Ne of unit components in each unit interval is equal to n (n≥3), the times Tc (or frequencies Fc, or absolute values of slopes Sc, or electric angular widths θew) of m (2≤m<n) pieces of consecutive unit components in the same unit interval may be made equal to each other, in some of the unit intervals. FIG. 7 illustrates one example of carrier wave in this case. The inventor of this disclosure found that, when the time Tc of each unit component is made variable, the times Tc (or frequencies Fc, or absolute values of slopes Sc, or electric angular widths θew) of at least two consecutive unit components are made equal to each other, so that harmonics of the frequency corresponding to the time Tc are likely to appear to some extent. Therefore, it is possible to more appropriately disperse harmonics, by making the times Tc (or frequencies Fc, or absolute values of slopes Sc, or electric angular widths θew) of at least two consecutive unit components equal to each other, in two consecutive unit intervals as a part of the unit intervals or in some unit intervals, while making the times Tc (or frequencies Fc, or absolute values of slopes Sc, or electric angular widths θew) of at least two unit components in the same unit interval different from each other.

Figure 8:
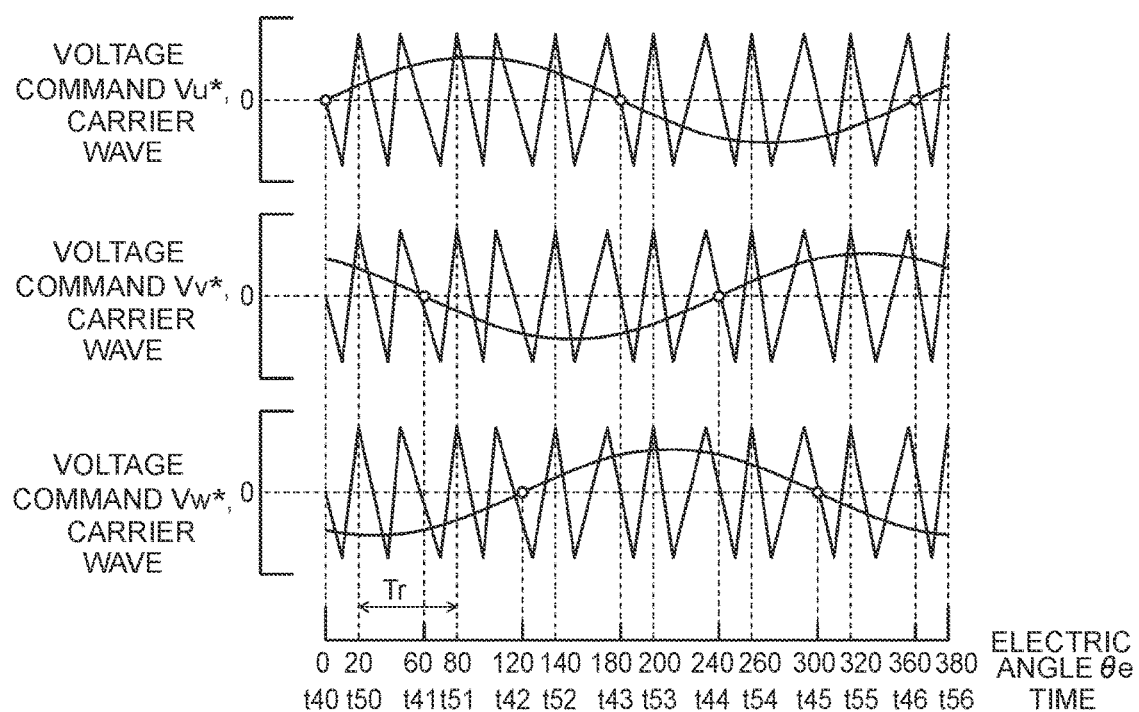
FIG. 8 is an explanatory view showing one example of waveforms of modulation waves Vu*, Vv*, Vw* of voltage commands of respective phases, and a carrier wave, in a modified example.

In the drive system installed on the electric vehicle 20 of the embodiment, the end electric angle and end point of each unit interval are set to coincide with the corresponding zero-crossing electric angle and the corresponding zero-crossing point, as shown in FIG. 4 and FIG. 5. However, as shown in FIG. 8, the end electric angle and end point of each unit interval may be set to be different from the corresponding zero-crossing electric angle and the corresponding zero-crossing point. FIG. 8 shows the case where the synchronous number Ns is constant, and is equal to 12 (the number Ne of unit components in each unit interval is equal to 4). In FIG. 8, 0 degree, 60 degrees, . . . in electric angle θe and times t40, t41, . . . indicate respective zero-crossing electric angles and respective zero-crossing points in time, and 20 degrees, 80 degrees, . . . in electric angle θe and times t50, t51, . . . indicate the end electric angles and end points of the respective unit intervals. In this case, too, it is possible to reduce electromagnetic noise while setting the number Ne of unit components in each unit interval to a desired value, as in the above embodiment.

Figure 9:
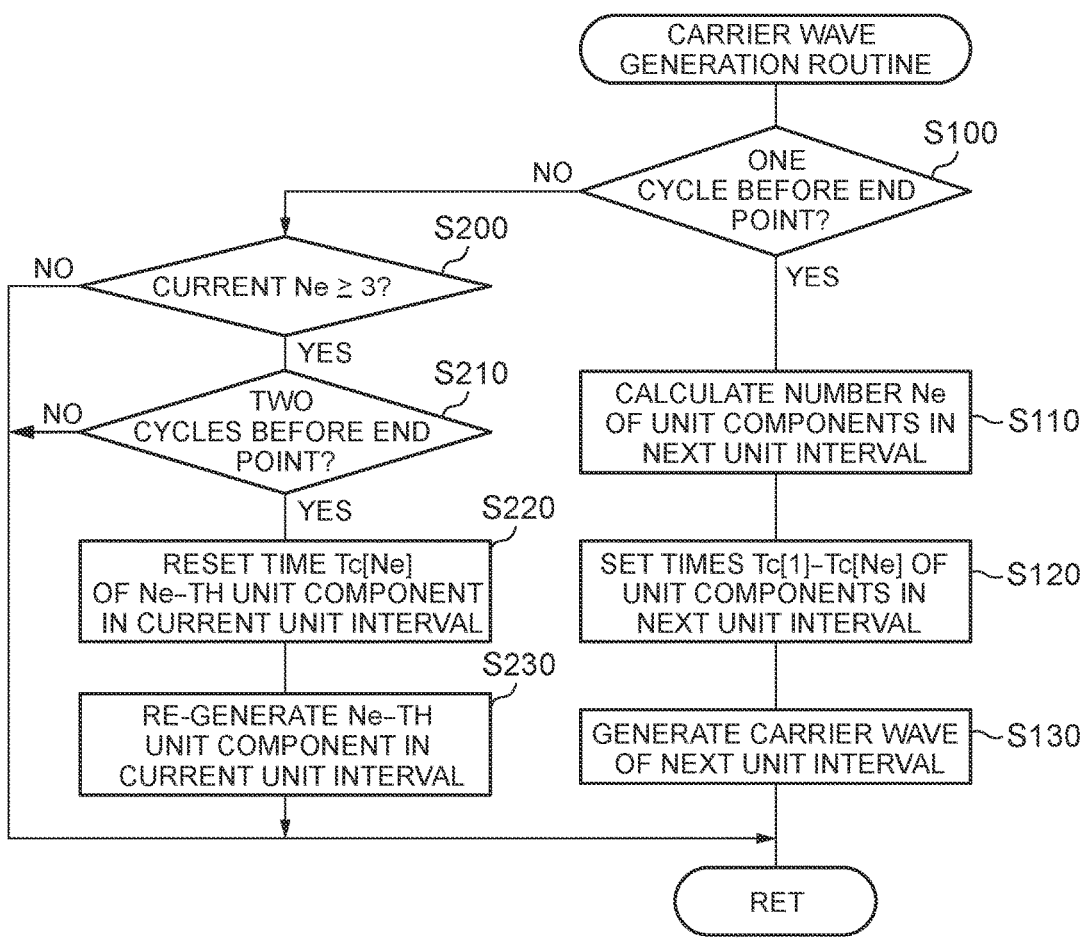
FIG. 9 is a flowchart illustrating one example of a carrier wave generation routine of a modified example.

In the drive system installed on the electric vehicle 20 of the embodiment, the electronic control unit 50 executes the carrier wave generation routine of FIG. 2, but may execute a carrier wave generation routine of FIG. 9, instead of that of FIG. 2. The carrier wave generation routine of FIG. 9 is identical with that of FIG. 2, except that steps S200-S230 are added. Accordingly, the same step numbers are assigned to the same steps, of which detailed description will not be provided.

In the carrier wave generation routine of FIG. 9, if the electronic control unit 50 determines that the point in time when this cycle of the routine is executed is not one cycle before the end point of the current unit interval, it compares the number Ne of unit components in the current unit interval with 3 (step S200). If the number Ne of unit components in the current unit interval is 3 or a greater value, the electronic control unit 50 determines whether the point in time when this cycle of the routine is executed is two cycles before the end point of the current unit interval (step S200). Here, "the point in time two cycles before the end point of the current unit interval" means the end point in time of the (Ne−2)-th unit component in the current unit interval.

If step S200 determines that the number Ne of unit components in the current unit interval is less than 3, or step S200 determines that the number Ne of unit components in the current unit interval is equal to or greater than 3, and step S210 determines that the point in time of execution of this cycle of the routine is not two cycles before the end point of the current unit interval, this cycle of the routine ends.

If step S200 determines that the number Ne of unit components in the current unit interval is equal to or greater than 3, and step S210 determines that the point in time of execution of this cycle of the routine is two cycles before the end point of the current unit interval, the time Tc [Ne] of the Ne-th unit component in the current unit interval is reset (step S220), and the Ne-th unit component in the current unit interval is re-generated (step S230). Then, this cycle of the routine ends.

In step S220, when the number Ne of unit components in the current unit interval is equal to 3, a difference between the 60-degree required time T60 in the current unit interval, and the sum of the actual time Tca[1] of the first unit component and the time Tc[2] of the second unit component is re-set as time Tc[3] of the third unit component. When the number Ne of unit components in the current unit interval is equal to 4 or a greater value, a difference between the 60-degree required time T60, and the sum of the actual times Tca[1] to Tca[Ne−2] of the first to (Ne−2)-th unit components and the time Tc[Ne−1] of the (Ne−1)-th unit component is reset as time Tc[Ne] of the Ne-th unit component. Through the processing of steps S220, S230, the end point of the current unit interval (the end point of the Ne-th unit component) can be more appropriately determined. In particular, this routine is useful when the 60-degree required time T60 (the rotational speed Nm of the motor 32) varies.

In the drive system installed on the electric vehicle 20 of the embodiment, the carrier wave is generated as illustrated in FIG. 4 and FIG. 5 when the amplitudes of the modulation waves Vu*, Vv*, Vw* of the voltage commands of the respective phases are smaller than the amplitude of the carrier wave (when pseudo three-phase AC voltage is applied to the motor 32). However, the carrier wave may be generated in the same manner, when the amplitudes of the modulation waves Vu*, Vv*, Vw* of the voltage commands of the respective phases are greater than the amplitude of the carrier wave (when overmodulation voltage is applied to the motor 32).

While the three-phase motor is used as the motor 32, in the drive system installed on the electric vehicle 20 of the embodiment, motors, such as a six-phase motor, other than the three-phase motor may be used. In any case, each unit interval has a given electric angular width (e.g., a width of 30 degrees when the number p of phases is 6) obtained by dividing one period (360 degrees in electric angle) of the modulation wave of the voltage command of each phase by twice the number p (p≥2) of phases of the motor 32.

While the battery 36 is used as the power storage device, in the drive system installed on the electric vehicle 20 of the embodiment, a capacitor may be used, in place of the battery 36.

While the boosting converter 40 is provided between the battery 36 and the inverter 34, in the drive system installed on the electric vehicle 20 of the embodiment, the boosting converter 40 may not be provided.

While the drive system is configured to be installed on the electric vehicle 20 in the embodiment, the drive system is only required to include a motor and an inverter, and the drive system may be configured to be installed on a hybrid vehicle, or may be configured to be installed on immobile equipment, such as construction equipment.

The corresponding relationships between the main elements of the embodiment and the main elements of the disclosure described in "SUMMARY" will be described. In this embodiment, the motor 32 is one example of the "motor", and the inverter 34 is one example of the "inverter", while the electronic control unit 50 is one example of the "electronic control unit".

The corresponding relationships between the main elements of the embodiment and the main elements of the disclosure described in "SUMMARY" are not intended to limit the elements of the disclosure described in "SUMMARY", since the embodiment is one example for explaining a specific form or configuration for carrying out the disclosure described in "SUMMARY". Namely, the disclosure described in "SUMMARY" should be interpreted based on the description therein, and the embodiment is a mere specific example of the disclosure described in "SUMMARY".

While the form or configuration for carrying out the disclosure has been described using the embodiment, the disclosure is by no means limited to the illustrated embodiment, but may be carried out in various forms, without departing from the scope of the claims.

The disclosure may be utilized in manufacturing industries of drive systems and automobiles, for example.

What is claimed is:

1. A drive system comprising:
   a multi-phase motor;
   an inverter including a plurality of switching devices and configured to drive the motor through switching of the switching devices; and
   an electronic control unit configured to perform pulse width modulation control, the pulse width modulation control being a control that generates pulse width modulation signals of the plurality of switching devices by comparing a modulation wave of a voltage command of each phase based on a torque command of the motor, with a carrier wave, and performs switching of the plurality of switching devices,
   the electronic control unit being configured to generate the carrier wave so as to satisfy conditions i) and ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals,
   i) in each of the unit intervals, a required time in the unit interval is equal to a total time of a plurality of unit components, and
   ii) in at least one of the unit intervals, durations of at least two unit components of the plurality of unit components are different from each other.

2. The drive system according to claim 1, wherein
   the electronic control unit is configured to generate the carrier wave such that the duration of the unit component changes irregularly.

3. The drive system according to claim 1, wherein
   the electronic control unit is configured to generate the carrier wave such that the number of the unit components is constant in two consecutive unit intervals of the plurality of unit intervals.

4. The drive system according to claim 1, wherein
   the electronic control unit is configured to generate the carrier wave, such that, in two consecutive unit intervals of the plurality of unit intervals, durations of the unit components immediately before and after a boundary of the two consecutive unit intervals are equal to each other.

5. The drive system according to claim 1, wherein
   the electronic control unit is configured to generate the carrier wave, such that, in at least a part of the unit intervals in each of which the number of the unit components is equal to a first predetermined number, the durations of a second predetermined number of consecutive ones of the unit components in the same unit interval are equal to each other, where the first predetermined number is 3 or greater, and the second predetermined number is equal to or greater than 2 and less than the first predetermined number.

6. The drive system according to claim 1, wherein
   the electronic control unit is configured to generate the carrier wave, such that each zero-crossing point in time at which the modulation wave of the voltage command of any of the phases crosses an axis of zero coincides with an end point in time of each of the unit intervals.

7. The drive system according to claim 1, wherein
   the number of the phases of the motor is 3, and the required time in the unit interval is a period of time required for the motor to rotate 60 degrees in electric angle.

8. A drive system comprising:
   a multi-phase motor;
   an inverter including a plurality of switching devices and configured to drive the motor through switching of the switching devices; and
   an electronic control unit configured to perform pulse width modulation control, the pulse width modulation control being a control that generates pulse width modulation signals of the plurality of switching devices by comparing a modulation wave of a voltage command of each phase based on a torque command of the motor, with a carrier wave, and performs switching of the plurality of switching devices,
   the electronic control unit being configured to generate the carrier wave so as to satisfy conditions i) and ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals,
   i) in each of the unit intervals, a required time in the unit interval is equal to a total time of a plurality of unit components, and ii) in at least one of the unit intervals, frequencies of at least two unit components of the plurality of unit components are different from each other.

9. A drive system comprising:
a multi-phase motor;
an inverter including a plurality of switching devices and configured to drive the motor through switching of the switching devices; and
an electronic control unit configured to perform pulse width modulation control, the pulse width modulation control being a control that generates pulse width modulation signals of the plurality of switching devices by comparing a modulation wave of a voltage command of each phase based on a torque command of the motor, with a carrier wave, and performs switching of the plurality of switching devices,
the electronic control unit being configured to generate the carrier wave so as to satisfy conditions i) and ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals, i) in each of the unit intervals, a required time in the unit interval is equal to a total time of a plurality of unit components, and
ii) in at least one of the unit intervals, absolute values of slopes of at least two unit components of the plurality of unit components are different from each other.

10. A drive system comprising:
a multi-phase motor;
an inverter including a plurality of switching devices and configured to drive the motor through switching of the switching devices; and
an electronic control unit configured to perform pulse width modulation control, the pulse width modulation control being a control that generates pulse width modulation signals of the plurality of switching devices by comparing a modulation wave of a voltage command of each phase based on a torque command of the motor, with a carrier wave, and performs switching of the plurality of switching devices,
the electronic control unit being configured to generate the carrier wave so as to satisfy conditions i) and ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals,
i) in each of the unit intervals, a required time in the unit interval is equal to a total time of a plurality of unit components, and
ii) in at least one of the unit intervals, electric angular widths of at least two unit components of the plurality of unit components are different from each other.

11. An automobile comprising:
a multi-phase motor;
an inverter including a plurality of switching devices and configured to drive the motor through switching of the switching devices; and
an electronic control unit configured to perform pulse width modulation control, the pulse width modulation control being a control that generates pulse width modulation signals of the plurality of switching devices by comparing a modulation wave of a voltage command of each phase based on a torque command of the motor, with a carrier wave, and performs switching of the plurality of switching devices,
the electronic control unit being configured to generate the carrier wave so as to satisfy conditions i) and ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals,
i) in each of the unit intervals, a required time in the unit interval is equal to a total time of a plurality of unit components, and
ii) in at least one of the unit intervals, durations of at least two unit components of the plurality of unit components are different from each other.

12. A method of controlling a drive system,
the drive system including a multi-phase motor, an inverter including a plurality of switching devices and configured to drive the motor through switching of the switching devices, and an electronic control unit configured to perform pulse width modulation control, the pulse width modulation control being a control that generates pulse width modulation signals of the plurality of switching devices by comparing a modulation wave of a voltage command of each phase based on a torque command of the motor, with a carrier wave, and performs switching of the plurality of switching devices,
the method comprising:
generating, by the electronic control unit, the carrier wave so as to satisfy conditions i) and ii) as follows, where a unit component is a segment of the carrier wave between two consecutive extreme values, and a unit interval is an interval of a given electric angular width obtained by dividing one period of the modulation wave of the voltage command by twice the number of phases of the motor, while the carrier wave extends over a plurality of unit intervals,
i) in each of the unit intervals, a required time in the unit interval is equal to a total time of a plurality of unit components, and
ii) in at least one of the unit intervals, durations of at least two unit components of the plurality of unit components are different from each other.

* * * * *